United States Patent
Kato (10) Patent No.: US 8,144,429 B2
(45) Date of Patent: Mar. 27, 2012

(54) MAGNETIC HEAD SLIDER WITH DIFFUSION STOP FILMS EACH OF WHICH IS DISPOSED BETWEEN THE ASSOCIATED TERMINAL PORTION AND LEAD PORTION OR BETWEEN THE ASSOCIATED LEAD PORTION AND SEED FILM

(75) Inventor: Atsushi Kato, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1006 days.

(21) Appl. No.: 12/150,147

(22) Filed: Apr. 25, 2008

(65) Prior Publication Data

US 2008/0266716 A1   Oct. 30, 2008

(30) Foreign Application Priority Data

Apr. 26, 2007   (JP) ................ 2007-117527

(51) Int. Cl.
*G11B 5/60*   (2006.01)
*G11B 5/31*   (2006.01)
*G11B 5/39*   (2006.01)

(52) U.S. Cl. ............ 360/234.5; 360/125.31; 360/125.74

(58) Field of Classification Search .............. 360/125.31, 360/125.74, 234.4, 234.5, 235.7, 236.5, 128
See application file for complete search history.

(56) References Cited

U.S. PATENT DOCUMENTS

| 5,998,016 | A | 12/1999 | Sasaki et al. | |
|---|---|---|---|---|
| 6,717,780 | B2 | 4/2004 | Hiramoto et al. | |
| 6,767,655 | B2 | 7/2004 | Hiramoto et al. | |
| 6,785,100 | B2 | 8/2004 | Hiramoto et al. | |
| 7,075,755 | B2 | 7/2006 | Haneda et al. | |
| 7,203,035 | B2 | 4/2007 | Koide et al. | |
| 2004/0179299 | A1* | 9/2004 | Sasaki et al. | 360/128 |
| 2005/0024773 | A1* | 2/2005 | Lille | 360/128 |
| 2006/0028764 | A1* | 2/2006 | Lille | 360/126 |
| 2007/0019325 | A1* | 1/2007 | Shimizu et al. | 360/126 |
| 2007/0201165 | A1* | 8/2007 | Kato et al. | 360/234.5 |

FOREIGN PATENT DOCUMENTS

| JP | 05-020635 | A | 1/1993 |
|---|---|---|---|
| JP | 2003-069112 | A | 3/2003 |
| JP | 2003-092440 | A | 3/2003 |
| JP | 2003-332537 | A | 11/2003 |
| JP | 2004-014806 | A | 1/2004 |
| JP | 2004-179219 | A | 6/2004 |
| JP | 2004335069 | A | 11/2004 |
| JP | 2005-268252 | A | 9/2005 |

* cited by examiner

*Primary Examiner* — Craig A. Renner
(74) *Attorney, Agent, or Firm* — Zilka-Kotab, PC (57) ABSTRACT

Embodiments of the present invention help to reduce the resistance variation of the heater provided in order to adjust the flying height of the slider. According to one embodiment, a magnetic head slider has a magnetic read/write device and a heater formed on the trailing end surface of the slider. The heater comprises a heating portion, terminal portions and lead portions. Where a terminal portion overlaps with a lead portion, a diffusion stop film is disposed between them. In addition, a diffusion stop film is disposed between a lead portion and a lower shield seed film (NiFe) under the associated stud. The diffusion stop films and are Ta films with a thickness of 5 nm or preferably at least 10 nm.

7 Claims, 7 Drawing Sheets

Thickness of Diffusion Stop Film VS 3σ of Heater Resistance

MAGNETIC HEAD SLIDER WITH DIFFUSION STOP FILMS EACH OF WHICH IS DISPOSED BETWEEN THE ASSOCIATED TERMINAL PORTION AND LEAD PORTION OR BETWEEN THE ASSOCIATED LEAD PORTION AND SEED FILM

CROSS-REFERENCE TO RELATED APPLICATION

The instant nonprovisional patent application claims priority to Japanese Patent Application No. 2007-117527 filed Apr. 26, 2007 and which is incorporated by reference in its entirety herein for all purposes.

BACKGROUND OF THE INVENTION

Magnetic disk drives comprise a rotating magnetic disk and a slider which has a magnetic read/write device mounted thereon to constitute a magnetic head and is supported by a suspension. The slider runs over the magnetic disk, allowing the magnetic read/write device to read/write magnetic information from/to the magnetic disk. The slider is designed to fly as an air-lubricated bearing by using the wedge film effect of air so as not to cause direct solid contact between the magnetic disk and the slider. To raise the recording density in the magnetic disk drive and consequently increase the storage capacity of the drive or reduce the size of the drive, it is effective to raise the linear recording density by reducing the distance between the slider and the magnetic disk, that is, the flying height of the slider.

The flying height of a slider may become lower than targeted since it depends on process fluctuations and operating environmental conditions such as ambient pressure and temperature. Therefore, when designing a slider, it is usual to set a margin to the flying height so that the slider does not make contact with the disk even in the worst case. If the slider can adjust the flying height according to the operating environment on a head by head basis, it is possible to widely reduce the distance between the magnetic read/write device and the magnetic disk by eliminating the margin while preventing contact between the slider and the disk.

In Japanese Patent Publication No. 1993-20635 ("Patent Document 1"), a technique is described in which a think film resistor, arranged between the upper and lower magnetic poles of an inductive thin film magnetic head, is energized, i.e., heated as necessary in order to project the front ends of the magnetic poles through thermal expansion and consequently reduce the distance between the front ends and the magnetic disk. Described in Japanese Patent Publication No. 2004-335069 ("Patent Document 2") is a technique to set the sheet resistance of the heater's heating portion higher than that of the lead portion so that heat is generated more from the heating portion than from the lad portion.

To implement a heater in a think-film magnetic head, its heating portion and lead portions are formed by thin-film fabrication process. Generally, the heating portion is formed and then the lead portions are formed so as to respectively overlap the contact regions of the heating portion. This causes inter-film diffusion as a variable factor for resistance. If resistance increases due to inter-film diffusion where a lead portion is bonded to a contact region of the heating portion, this increases the resistance of the hater heat and the heat loss in the lead portion. In this case, it may be impossible for the heating portion to generate as much heat as intended. In addition, the resistance variation of the heater makes it impossible to reduce the flying height as intended. In the above-mentioned techniques, the resistance variation of the heater due to inter-film diffusion is not taken into consideration.

In manufacturing a magnetic head slider provided with a heater for controlling the flying height, the terminal portions and the lead portions of the heater are formed separately. Therefore, resistance may increase due to inter-film diffusion where a lead portion is stacked on a lead portion, resulting in an increased heat loss. Consequently, if the heating portion does not generate as much heat as designed, it is difficult to lower (control) the flying height as intended.

BRIEF SUMMARY OF THE INVENTION

Embodiments of the present invention help to reduce the resistance variation of the heater provided in order to adjust the flying height of the slider. According to the particular embodiment of FIG. 1A, a magnetic head slider 1 has a magnetic read/write device 2 and a heater 11 formed on the trailing end surface 8 of the slider 1a. The heater comprises a heating portion 11a, terminal portions 11b and lead portions 11c. Where a terminal portion 11b overlaps with a lead portion, a diffusion stop film 11d is disposed between them. In addition, a diffusion stop film 11e is disposed between a lead portion 11c and a lower shield seed film (NiFe) 16 under the associated stud 17. The diffusion stop films 11d and 11b are Ta films with a thickness of 5 nm or preferably at least 10 nm.

DETAILED DESCRIPTION OF THE INVENTION

Embodiments of the present invention relate to a slider structure to realize high density recording in magnetic disk drives and, in particular, to a flying height-adjustable slider capable of adjusting the distance between the magnetic disk and the magnetic head.

It is an object of embodiments of the present invention to reduce the resistance variation of the heater provided in order to adjust the flying height of the slider.

To achieve the above object, a representative magnetic head slider according to embodiments of the present invention comprises a magnetic head formed on the trailing end surface of the slider; a heater which is disposed near the magnetic head and comprises a heating portion, terminal portions extended respectively from the opposite ends of the heating portion and lead portions stacked respectively on the terminal portions; studs each of which is formed on an end of the associated terminal portion via a seed film; and diffusion stop films each of which is disposed between the associated terminal portion and lead portion or between the associated lead portion and seed film.

The heating portion and the terminal portions are made of NiCr or NiFe, the lead portions are made of Cu or Au and the diffusion stop films are made of Ta, Cr or NiCr.

The thickness of the terminal portions is about 100-200 nm, the thickness of the lead portions is about 150-250 nm and the thickness of the diffusion stop films is about 5 nm or preferably 10 nm at least.

According to embodiments of the present invention, it is possible to reduce the resistance variation of a heater provided in a magnetic slider in order to adjust of the flying height thereof.

A magnetic head slider according to an embodiment of the present invention and a magnetic disk drive using this embodiment are described below with reference to the drawings.

Figure 2:
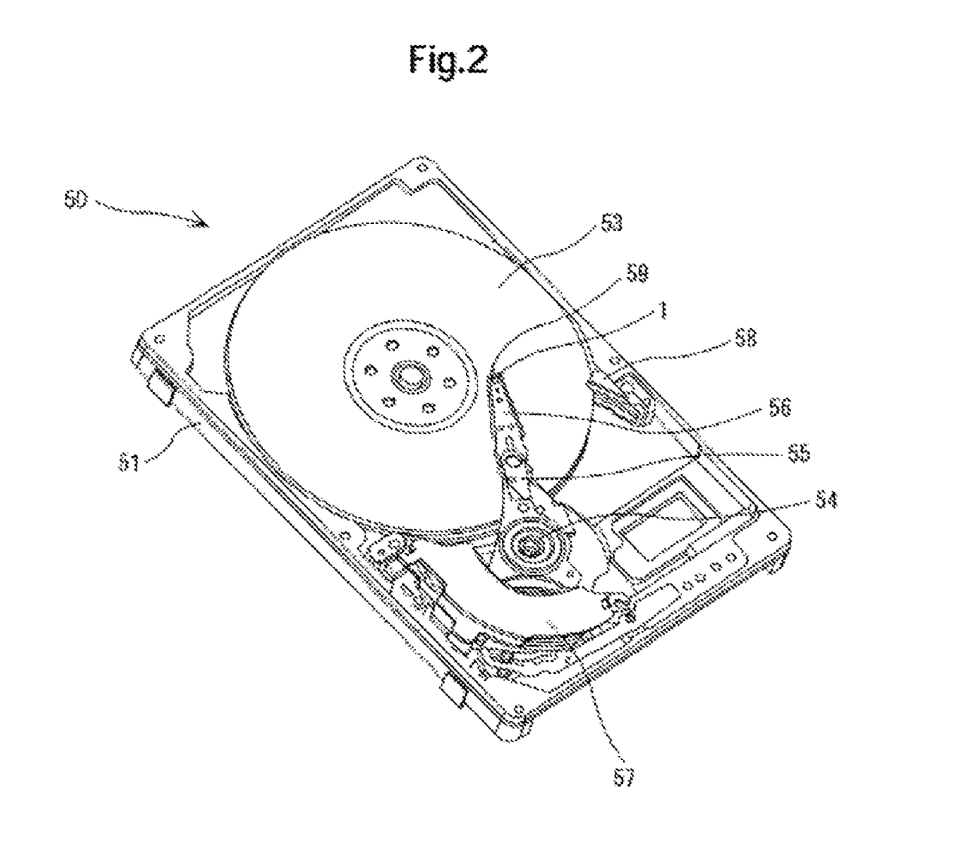
FIG. 2 is a top view of a magnetic disk drive where the magnetic head slider embodiment is mounted.

FIG. 2 shows the configuration of the magnetic disk drive 50. Attached to the rotation axis of a spindle motor fixed to a base 51, a magnetic disk 53 is driven to rotate. An actuator arm 55 is pivotally supported by a pivot 54. A suspension 56 is attached to one end of the actuator arm 55 while a coil (not shown in the figure) constituting a voice coil motor (VCM) 57 is attached to the other end. To the front end of the suspension 56, a magnetic head slider 1 is attached. On the periphery of the magnetic disk 53, the base 51 is provided with a ramp structure 58. The ramp structure 58 has a slope formed thereon so that the lift tab 59 runs up the slope when the magnetic head slider 1 is unloaded.

Energizing the coil of the VCM 57 generates rotation torque forcing the actuator arm 55 to move the suspension 56 attached thereon in the radial direction of the magnetic disk 53. By this rotary action, the magnetic head slider 1 attached to the front end of the suspension 56 is positioned to a certain track for read/write of data. During unload, the magnetic head slider 1 is moved so that the lift tab runs up the slope of the ramp structure 58. During load, the magnetic head slider 1, standing by on the ramp structure 58, is loaded to the recording surface of the magnetic disk 53.

The magnetic slider 1 is designed to fly as an air-lubricated bearing by using the wedge film effect of air so as not to cause direct solid contact with the magnetic disk 53. The flying height of the magnetic head slider 1 is about 10 nm at most. Note that although the magnetic disk drive described here has a load/unload mechanism, the drive may be designed so that when the drive is stopped, the magnetic head slider 1 may employ the contact start and stop system. In this case, the magnetic head slider 1 stands by in a certain area of the magnetic disk 53 when the drive is not operated. In addition, the magnetic recording style may be either in-plane recording or perpendicular recording.

Figure 3:
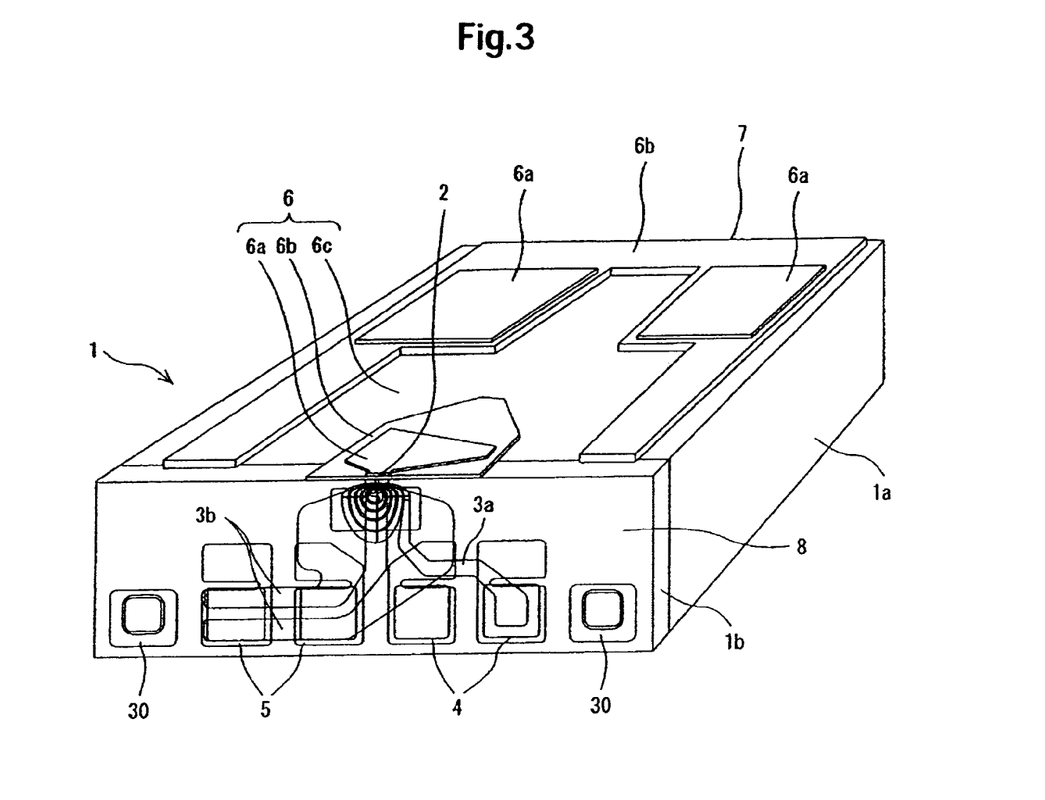
FIG. 3 is a perspective view of the magnetic head slider embodiment.

FIG. 3 is an enlarged view of the magnetic head slider 1. The magnetic head slider 1 is composed of a base block (slider) 1a, which is formed of a ceramic material such as sintered alumina and titan carbide, and a thin-film magnetic head block 1b. Measuring 1.25 mm in length, 1.0 mm in width and 0.3 mm in thickness, the slider 1a (called a pico-slider) is almost a rectangular solid having six faces, namely a flying face 6, a leading end surface 7, an trailing end surface 8, both side edges and a rear face. For such purposes as to raise the positioning accuracy by reducing the weight and lower the cost, the slider may be scaled down to 0.85 mm in length, 0.7 mm in width and 0.23 mm in thickness (called a femto-slider). By ion milling, etching or the like, the flying face 6 is processed to a step bearing having small steps. Generating air pressure against the magnetic disk, it works as an air bearing to bear the load applied to the rear face.

Substantially, the flying face 6 has three kinds of surfaces which are different in height, namely, rail surfaces 6a nearest to the disk, shallow groove surfaces 6b which are recessed about 100 to 200 nm from the rail surfaces 6a to constitute a step bearing surface, and a deep groove surface which is recessed about 1 µm from the rail surfaces 6a. Air flow is generated by the spinning disk. When air goes to a rail surface 6a from the shallow groove surface 6b constituting the step bearing surface on the leading end surface 7 side, the converging flow path compresses the air, generating a positive air pressure. On the other hand, when air goes to the deep groove surface 6c from a rail surface 6a or the shallow groove surface 6b, the diverging flow path generates a negative air pressure. Note that FIG. 3 is schematically depicted and the grooves are not so deep.

The magnetic head slider 1 is designed to take such a flying attitude that the leading end surface 7 is kept higher than the trialing end surface 8. Accordingly, the vicinity of the outflow edge comes closest to the disk. In the vicinity of the outflow edge, the rail surfaces 6a are projected from the shallow groove surface 6b and deep groove surface 6c. Therefore, the rail surfaces 6a come closest to the disk unless the slider's pitch or roll angle exceeds a certain limit. A magnetic read/write device 2 of the magnetic head is formed in a region of the rail surface 6a which belongs to the think-film head block 1b. The geometry of the flying face 6 is designed so that the distance between the magnetic read/write device 2 and the disk is kept appropriately at about 10 nm as the result of balancing among the load given by the suspension and the positive and negative air pressures occurring along the flying face 6. Note that while the flying face 6 described here is a two-step bearing face composed of three kinds of substantially parallel surfaces 6a, 6b and 6c, the flying step bearing face may be composed of four or more kinds of parallel surfaces.

Figure 1A:
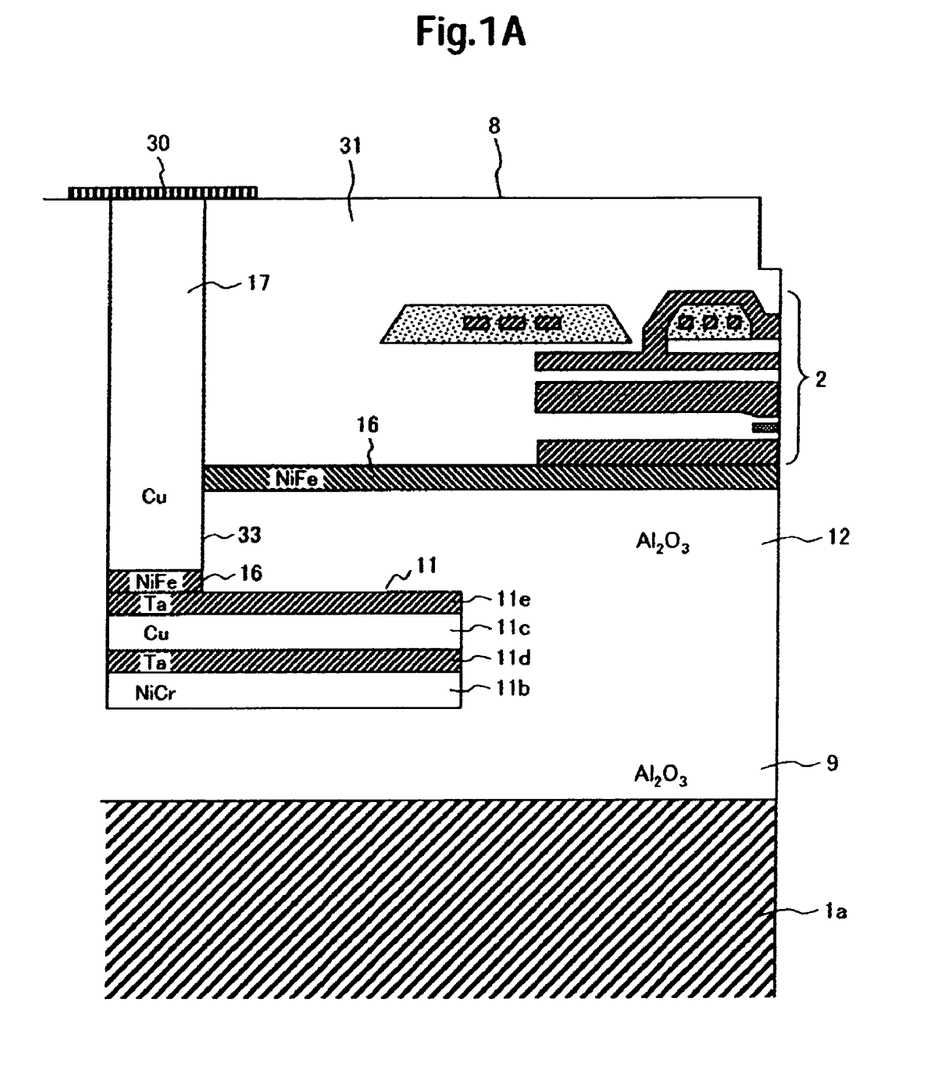
FIG. 1A shows a cross section of a magnetic head slider embodiment. The cutting position is determined so as to indicate how the heating resistor, the stud and the magnetic read/write device are related with each other.
Figure 1B:
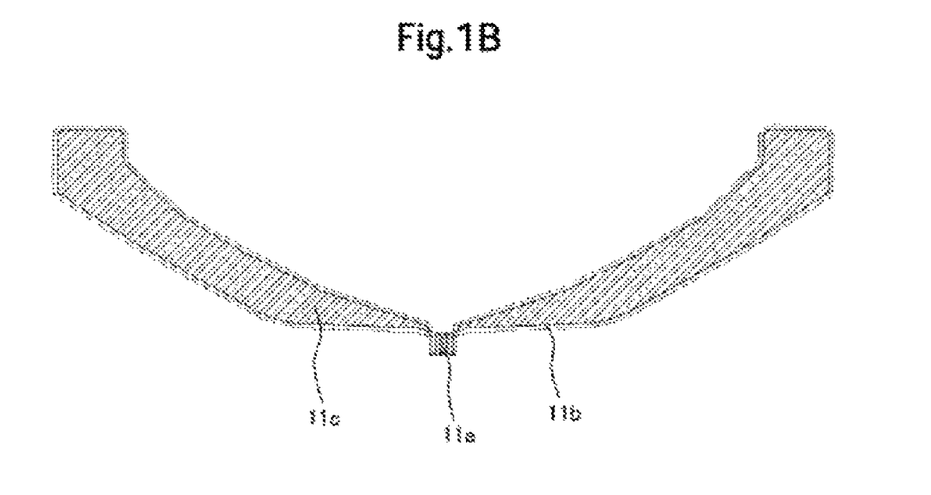
FIG. 1B shows how the heater of the magnetic head slider embodiment is configured.
Figure 4:
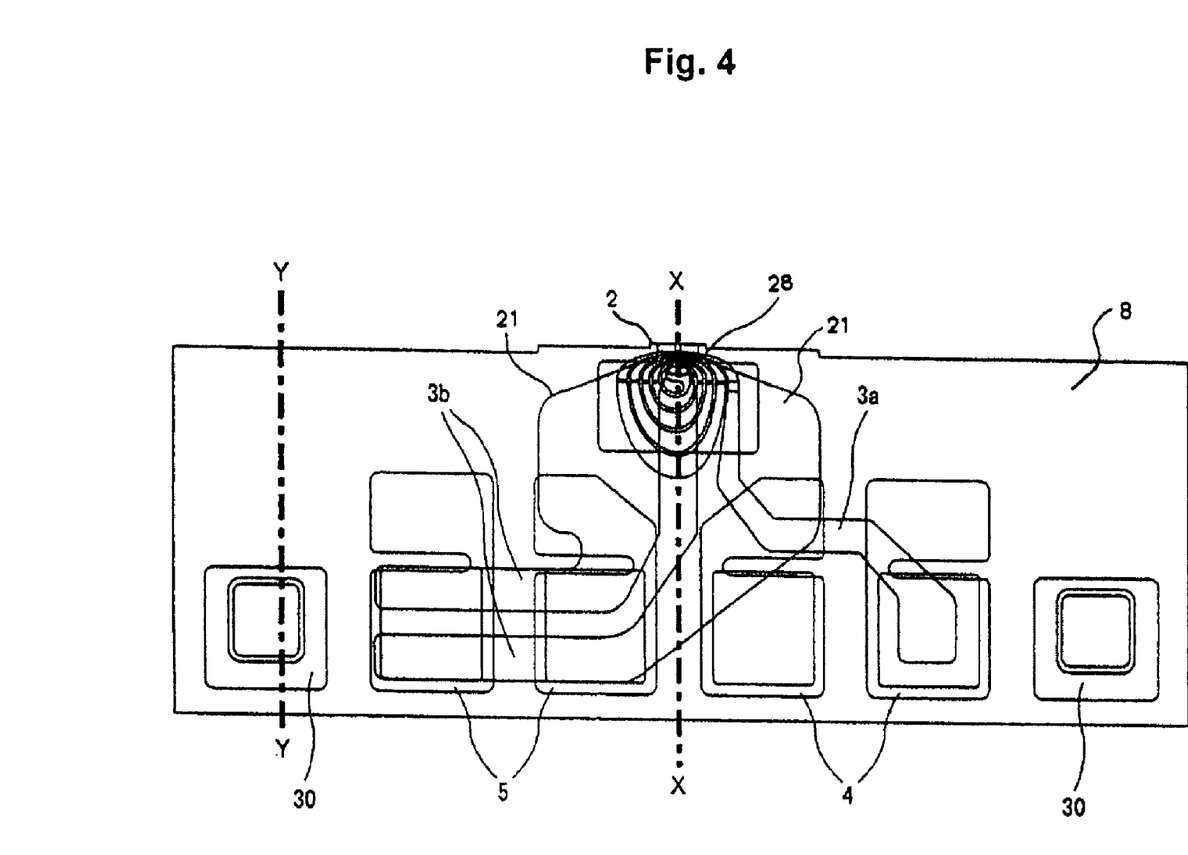
FIG. 4 shows the magnetic head slider embodiment viewed from the trailing end surface side.
Figure 5:
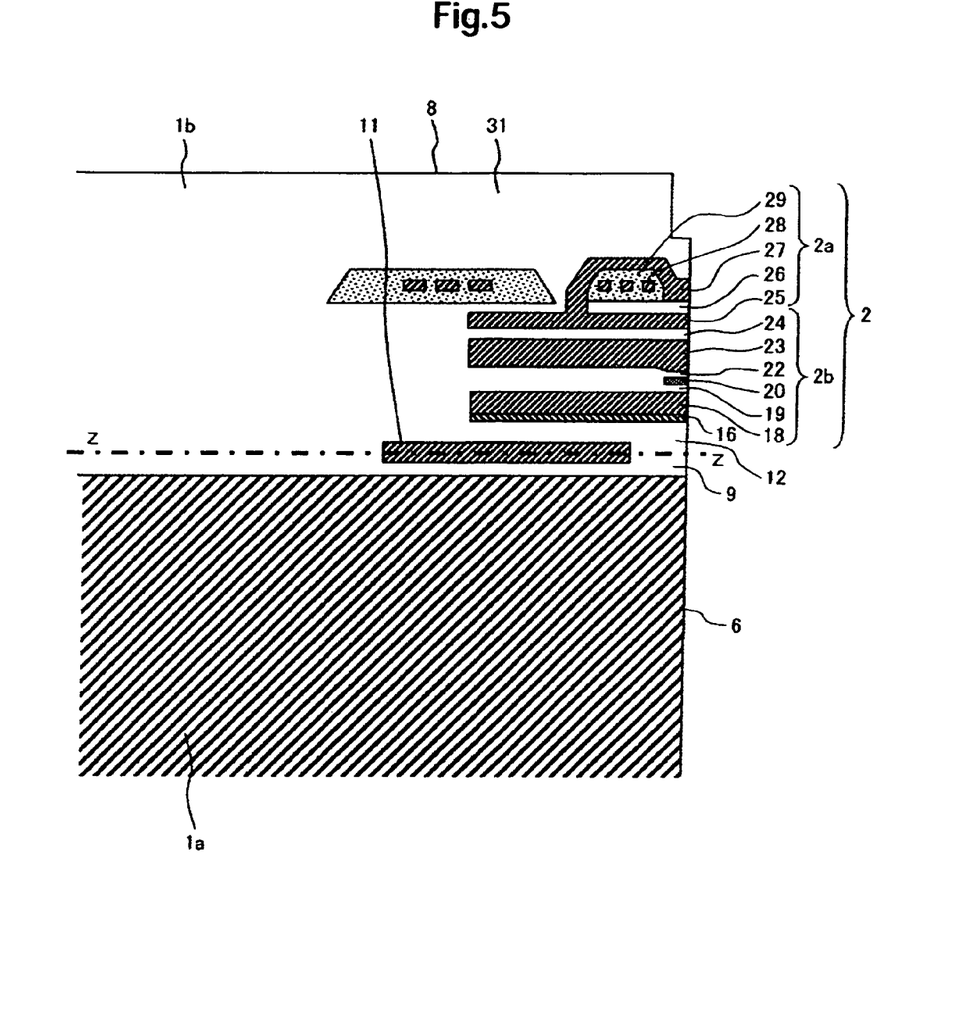
FIG. 5 shows a cross section along line X-X of FIG. 4.

In FIG. 4, the magnetic head slider 1 shown in FIG. 1 is viewed from the trailing end surface 8 side. FIG. 5 is an enlarged view of a cross-section of the thin-film head block 1b, which is cut along line X-X of FIG. 4 so as to include the region where the magnetic read/write device 2 is formed. Shown in FIG. 5 is an enlarged view of a cross section of a heating resistor relay terminal 30 which is cut along line Y-Y of FIG. 4. FIG. 1B shows a cross-section of a heater (heating resistor) 11 which is out along line Z-Z' of FIG. 5 and viewed from the trailing end surface 8 side.

Referring to FIGS. 1B, 4, 5 and 6, the following describes how the thin-film head block 1b of the magnetic head slider 1 is configured according to an embodiment of the present invention. As shown in FIG. 5, a magnetic read/write device 2 composed of a magnetic read device 2b and a magnetic write device 2a is formed in the thin-film magnetic head block 1b on the base block (slider) 1a by using think-film process. In addition, the heater (heating resistor) 11 is formed between the base block 1a and the magnetic read device 2b. By heating a par of the thin-film magnetic head block 1b, the heating resistor 11 thermally expands and consequently protrudes the part in order to adjust the flying height of the magnetic read/write device 2. Further, a hard protective film 31 is formed so as to cover the heating resistor 11 and the magnetic read/write device 2.

To raise the speed of adjusting the flying height of the magnetic head slider 1 as high as possible while suppressing the thermal influence of the heating resistor 11 on the magnetic read device 2b, the heating resistor 11 should be disposed between the base block (slider) 1a and the magnetic read device 2b with the front end of the heating resistor 11 recessed than that of the magnetic read device 2b.

Referring to FIG. 4, write relay terminals 4, read relay terminals 5 and heating resistor relay terminals 30 are formed on the trailing end surface 8 of the magnetic head slider 1. The write relay terminals 4 are for external electrical connection of lead lines 3a (of the two lines, only one appears in FIG. 4) which are in conductive contact with the magnetic write device 2a. The read relay terminals 5 are for external electrical connection of lead lines 3b which are in conductive contact with the electrodes of the magnetic read device 2b. The heating resistor relay terminals 30 are for external electrical connection of a stud 17 (see FIG. 6) which is in conductive contact with the heating resistor 11. Note that although the magnetic read/write device 2 and the lead lines 3a and 3b are covered by the hard protective film 31, the magnetic read/write device 2 and the lead lines 3a and 3b are visible on the trailing end surface 8 as shown in FIG. 4 since the hard protective film 31 is transparent.

Along the process flow, the following describes how the magnetic head's magnetic read/write device 2 and heater (heating resistor) 11 are fabricated. As shown in FIG. 5, a foundation insulating film 9 of alumina or the like is formed on the base block (slider) 1a. On the foundation insulating film 9, a heating resistor 11 is formed. As shown in FIG. 1B where the heating resistor 11 is viewed from the trailing end surface 8 side, the heating resistor 11 comprises a heating portion 11a, a terminal portion 11b and a lead portion 11c. The heating portion 11a is a meandering think-film metal line. The terminal portion 11b is extended from the heating portion 11a. The lead portion 11c is stacked on the terminal portion 11b. The heating resistor 11 will be described later in detail.

Then, as shown in FIG. 5, an insulating film 12 of alumina or the like is formed on the heating resistor 11 and a lower shield film 18 is formed on the insulating film 12 via a seed film 16. After the lower shield film 18 is planarized by CMP process, a lower gap film 19 of alumina or the like is formed on the planarized lower shield film 18 and then a magnetoresistive device (hereinafter denoted as the MR device) 20, i.e., a magnetic sensor, and a pair of electrodes 21 (see FIG. 4) to bring out a magnetic signal from the MR device 20 as an electrical signal are formed. Then, after an upper gap film 22 of alumina or the like and an upper shield film 23 are formed, the upper shield film 23 is planarized by CMP process. On the planarized upper shield film 23, an upper shield insulating film 24 is formed to complete fabrication of the heating resistor 11 and magnetic read device 2b.

Then, the following describes how the magnetic write device 2a is fabricated. On the upper shield insulating film 24, a lower magnetic pole 25 is formed. Then, a magnetic gap film 26 of alumina or the like is formed thereon. On the magnetic gap film 26, a coil 28 to generate magnetic field and an organic insulating film 29 to cover the coil 28 are formed. Then, an upper magnetic pole 27 having a back gap portion connected magnetically with the lower magnetic pole 25 is formed. Then, a hard protective film 31 of alumina or the like to protect and insulate the thus formed elements is formed so as to cover all of them. On the hard protective film, the write relay terminals 4 for supplying current to the coil 28 from external, the read relay terminals 5 for carrying retrieved signal to external and the heating resistor relay terminals 30 for supplying current to the heating resistor 11 are formed at the same time as shown in FIG. 4.

Figure 6:
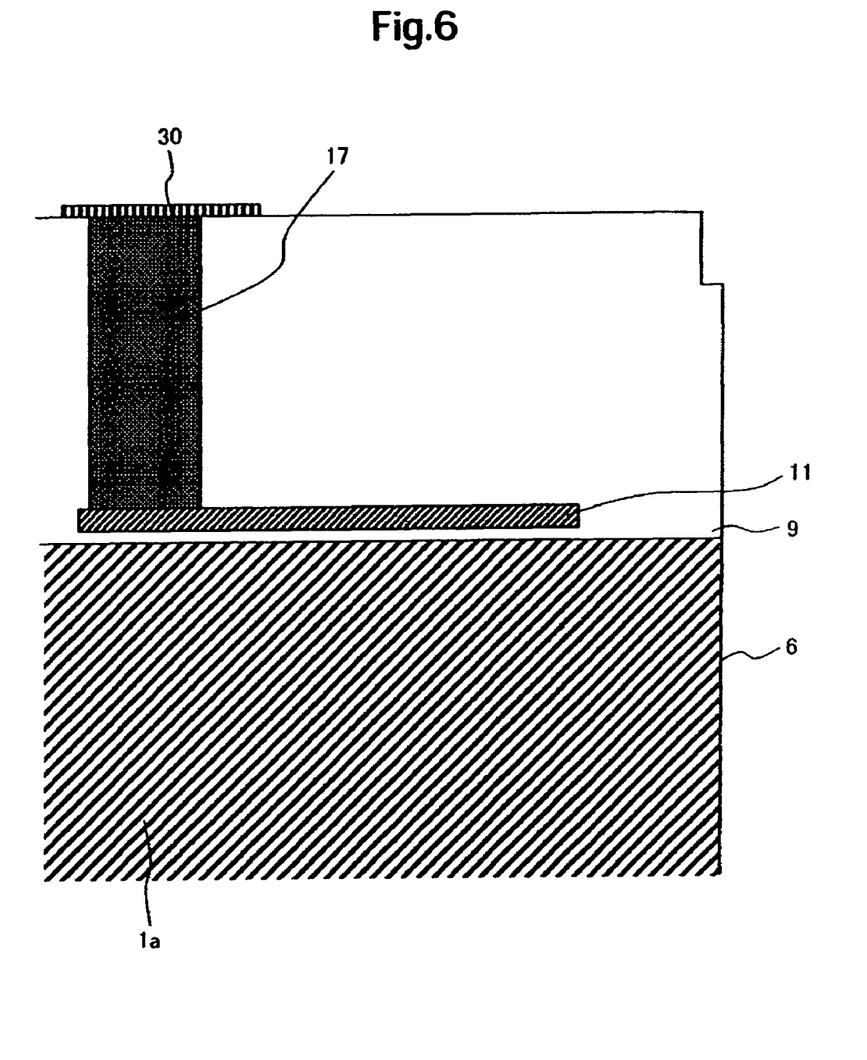
FIG. 6 shows a cross section along line Y-Y of FIG. 4.

The heating resistor relay terminals 30 are formed on studs 17 as shown FIG. 6. Each stud 17 is formed by plating the upper side of one lead end of one lead end of the heating resistor 11 with copper. The respective insulating films are formed so as to develop a continuous hole which is used to form the stud 17. Likewise, the read relay terminals 4 and write relay terminals 5 are formed on studs which are respectively formed on the ends of the lead lines 3a and 3b.

Since the height of the slider is adjusted by the heat from the heating resistor 11, the heating portion 11a, terminal portion 11b and the lead portion 11c require highly accurate resistance control. However, since the heating portion 11a, terminal portion 11b and lead portion 11c are formed separately, inter-film diffusion occurs where the terminal portion 11b overlaps with the lead portion 11c. Since this causes a large resistance variation of the heating resistor 11, the heat generated by the heating portion 11a sometimes differs greatly from the expected level. In this case, the flying height cannot be reduced as expected, making it difficult for the device to function as a thin-film magnetic head. In terms of area, about 90% of the terminal portion 11b overlaps (with 100% of the lead portion 11c of the heating resistor 11 may cause a large resistance variation or resistance increase. In addition, inter-film diffusion may occur between the end of the lead portion 11c and the lower shield seed film 16 (see FIG. 1A) at the bottom of the stud 17 and consequently increase the resistance variation of the heating resistor 11.

Therefore, in order to suppress the resistance variation due to inter-film diffusion between the terminal portion 11b and the lead portion 11c, a diffusion stop film 11d is formed between the terminal portion 11b and the lead portion 11c where their patterns overlap with each other. Likewise, in order to suppress the resistance variation due to inter-film diffusion between the end of the lead portion 11c and the lower shield seed film 16 (see FIG. 1A) at the bottom of the stud 17, a diffusion stop film 11e is formed between the lead portion 11c and the lower shield seed film 16.

Referring to FIGS. 1A and 1B, the following describes how the heating resistor 11 is fabricated. FIG. 1A shows a cross section where the heating resistor 11, the stud 17 and the magnetic read/write device 2 are recognized relative to each other. Referring to FIG. 1A, the lead portion 11c of the heating resistor 11 is stacked on the terminal portion 11b. The heating resistor 11 is formed by using thin-film process. On the foundation insulating film 9, the heating portion 11a and the terminal portion 11b are formed by using a metal material, namely NiCr. Their thickness is about 0.15 µm (150 nm). Instead of NiCr, it is possible to use NiFe or the like. As well, different materials may be used respectively for the heating portion 11a and the terminal portion 11b. Then, the diffusion stop film 11d of Ta is formed on the NiCr terminal portion II b. At least, it has a thickness of 5 nm or preferably 10 nm. On the diffusion stop film 11d, the lead portion 11c of a metal material is formed with a thickness of about 0.20 µm (200 nm). The metal material is Cu and shows a smaller resistivity than the heating portion 11a. Cu may be replaced by Au or the like. The resistance of the lead portion 11b is about 5Ω. On the lead portion 11c of Cu, a Ta film is formed as the diffusion stop film 11e. At least, it has a thickness of 5 nm or preferably 10 nm. To suppress the heat loss in the diffusion stop films 11d and 11e, it is preferable that their sheet resistance be smaller than that of the terminal portion 11c. To avoid thermal deformation, it is preferable that their thermal expansion coefficient be smaller than those of the terminal portion 11b and lead portion 11c. While Ta is selected as a material meeting these requirements, it is also possible to use Cr, NiCr or the like instead of Ta.

The heating portion 11a is an about 4.5 µm-wide line which meanders in an about 60 µm (width) area filled with alumina. The resistance of the heating portion 11a and terminal portion 11b is about 500Ω. Preferably, the resistance of the lead portion 11c is not larger than a fifth that of the heating portion 11a and terminal portion 11b. Specifically, if the resistance of the heating portion 11a and terminal portion 11b is set to about 200-600Ω, the resistance of the lead portion 11c is set to about 3-60Ω. The thickness of the terminal portion 11b is about 100-200 nm while that of the lead portion 11c is about 150-250 nm.

Then, after the insulation film 12 is formed on the diffusion stop film 11e and the foundation insulating film 9, a hole 33 through which the stud 17 is to be formed is opened. On the insulating film 12, the lower shield layer seed film (NiFe) 16 is formed. This film is also deposited on the exposed part of the diffusion stop film 11e through the hole 33. Then, after the magnetic read/write device 2 is formed on the lower shield seed film (NiFe) 16, the hard protective film 31 is formed so as to cover the surface excluding the hole 33. Then, the hole 33 is plated with Cu to form the stud 17. Then, the heating resistor relay terminal 30 is formed on the stud 17 which is exposed to the trailing end surface 8.

Figure 7:
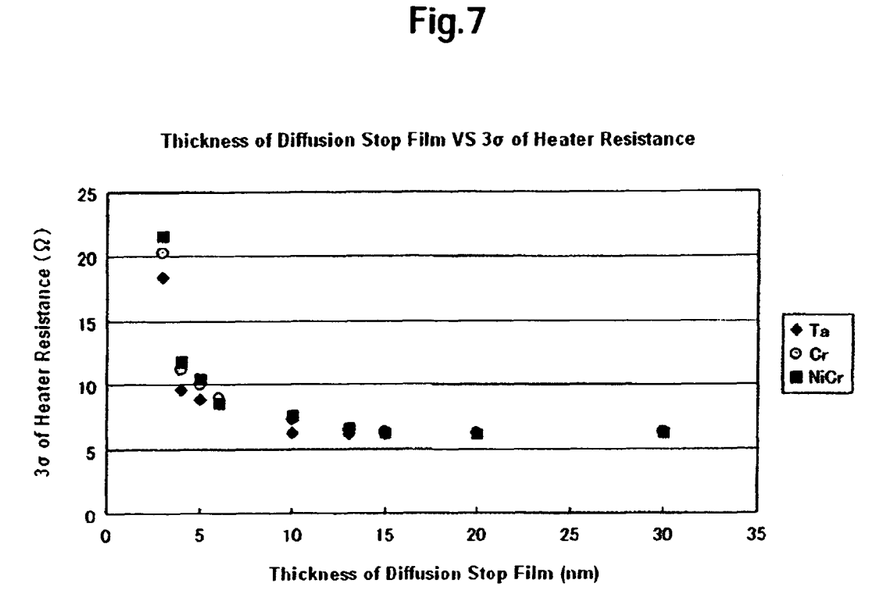
FIG. 7 is a graph showing a result of examining how the resistance variation 3σ of the heating resistor is dependent on the thickness of the diffusion stop film.

FIG. 7 shows a result of examining how the resistance of the heating resistor 11 depends on the thickness of the diffusions stop films 11d and 11e. The horizontal axis represents the thickness of the diffusion stop film 11d or 11e while the vertical axis represents the resistance variation 3σ of the heating resistor 11. As understood from the result of FIG. 7, it is possible to prevent the resistance variation 3σ of the heating resistor 11 from increasing if the diffusion stop films 11d and 11e are set to have a thickness of 5 nm or preferably 10 nm at least.

As described with the above embodiment, since the lead portion 11c of the heating resistor 11 is formed on the terminal portion 11b which is formed together with the heating portion 11a, it is therefore important not to introduce resistance due to inter-film diffusion between the lead portion 11c and the terminal portion 11b. As well, it is important not to introduce resistance due to inter-film diffusion between the lead portion 11c and the lower shield seed film 16 formed thereon. Although inter-film diffusion also occurs between the lower shield seed film 16 and the stud 17, this does not have influence on the resistance of the heating resistor 11 since the stud 17 has a large enough volume. Also note that although the heating portion 11a and the terminal portion 11b are formed and then the lead portion 11c is formed in the present embodiment, this order may be reversed, that is, after the lead portion 11c is formed, the heating portion 11a and the terminal portion 11b may be formed so that the terminal portion 11b overlaps with the lead portion 11c. In this case, the stud 17 is formed on the end of the terminal portion 11b via the Ta film and seed film 16.

As described so far, the above embodiments can prevent the resistance variation of the heating resistor from increasing. Therefore, it is possible to attain as much heat from the heating portion as intended. Consequently, the flying height of the slider can be reduced as expected.

What is claimed is:

1. A magnetic head slider comprising: a slider body; a magnetic head formed on a trailing end surface of the slider body; a heater which is disposed near the magnetic head and comprises a heating portion, terminal portions extended respectively from the opposite ends of the heating portion and lead portions stacked respectively on the terminal portions; studs, each of which is formed on an end of the associated terminal portion via a seed film; and diffusion stop films, each of which is disposed between the associated terminal portion and lead portion or between the associated lead portion and seed film.

2. A magnetic head slider according to claim 1 wherein a sheet resistance of the diffusion stop films is lower than that of the heating portion and than that of the terminal portions.

3. A magnetic head slider according to claim 1 wherein a thermal expansion coefficient of the diffusion stop films is smaller than that of the heating portion and than that of the terminal portions.

4. A magnetic head slider according to claim 1 wherein the heating portion and the terminal portions are made of NiCr or NiFe, the lead portions are made of Cu or Au, and the diffusion stop films are made of Ta, Cr or NiCr.

5. A magnetic head slider according to claim 1 wherein a thickness of the terminal portions is about 100-200 nm, the thickness of the lead portions is about 150-250 nm and the thickness of the diffusion stop films is about 5 nm or thicker.

6. A magnetic head slider according to claim 1 wherein a resistance of each lead portion is not higher than a fifth that of the heating portion and the associated terminal portion.

7. A magnetic head slider according to claim 1 wherein a resistance of the heating portion and terminal portions is about 200-600 Ω while the resistance of the lead portions is about 3-60 Ω.

* * * * *